United States Patent [19]
Tanaka et al.

[11] Patent Number: 5,217,195
[45] Date of Patent: Jun. 8, 1993

[54] SEAT POSITION ADJUSTMENT MECHANISM

[75] Inventors: Aki Tanaka, Encino; David E. Landis, Oxnard, both of Calif.

[73] Assignee: P. L. Porter Company, Woodland Hills, Calif.

[21] Appl. No.: 312,314

[22] Filed: Feb. 16, 1989

Related U.S. Application Data

[63] Continuation of Ser. No. 132,873, Dec. 14, 1987, abandoned.

[51] Int. Cl.⁵ ............................................. B60N 1/02
[52] U.S. Cl. ..................................... 248/396; 248/394
[58] Field of Search ................... 248/396, 429, 394; 297/375, 396

[56] References Cited

U.S. PATENT DOCUMENTS

| | | | |
|---|---|---|---|
| 3,724,797 | 4/1973 | Freitag et al. | 248/421 X |
| 4,326,690 | 4/1982 | Pickles et al. | 248/396 |
| 4,515,339 | 5/1985 | Kluting et al. | 248/421 X |
| 4,552,405 | 11/1985 | Wiers | 297/375 |
| 4,570,997 | 2/1986 | Tanizaki et al. | 248/429 X |
| 4,577,730 | 3/1986 | Porter | 297/375 X |

FOREIGN PATENT DOCUMENTS 1362561 8/1974 United Kingdom ............... 248/396

Primary Examiner—Alvin C. Chin-Shue
Attorney, Agent, or Firm—Beehler & Pavitt

[57] ABSTRACT

A support mechanism for 6-way adjustable automotive seats has a base and a seat support mounted on the base by mechanical locks telescopable for adjusting the height and tilt of the seat support. The mechanism is improved in that spring biased levers compensate for variable spring force to apply an approximately constant seat lifting force throughout the adjustment range of the mechanism.

5 Claims, 5 Drawing Sheets

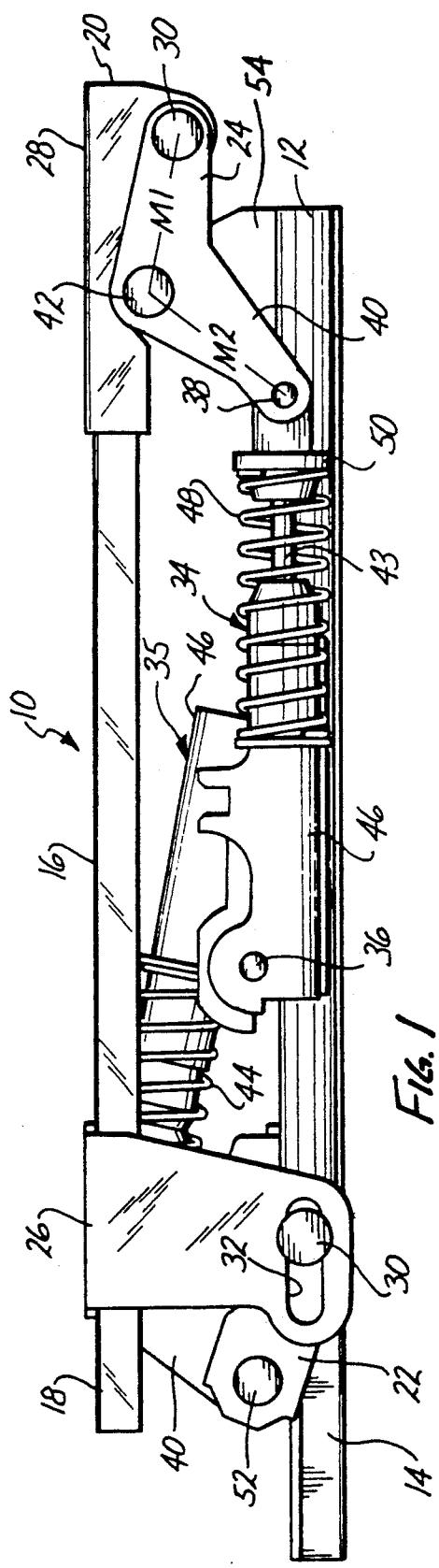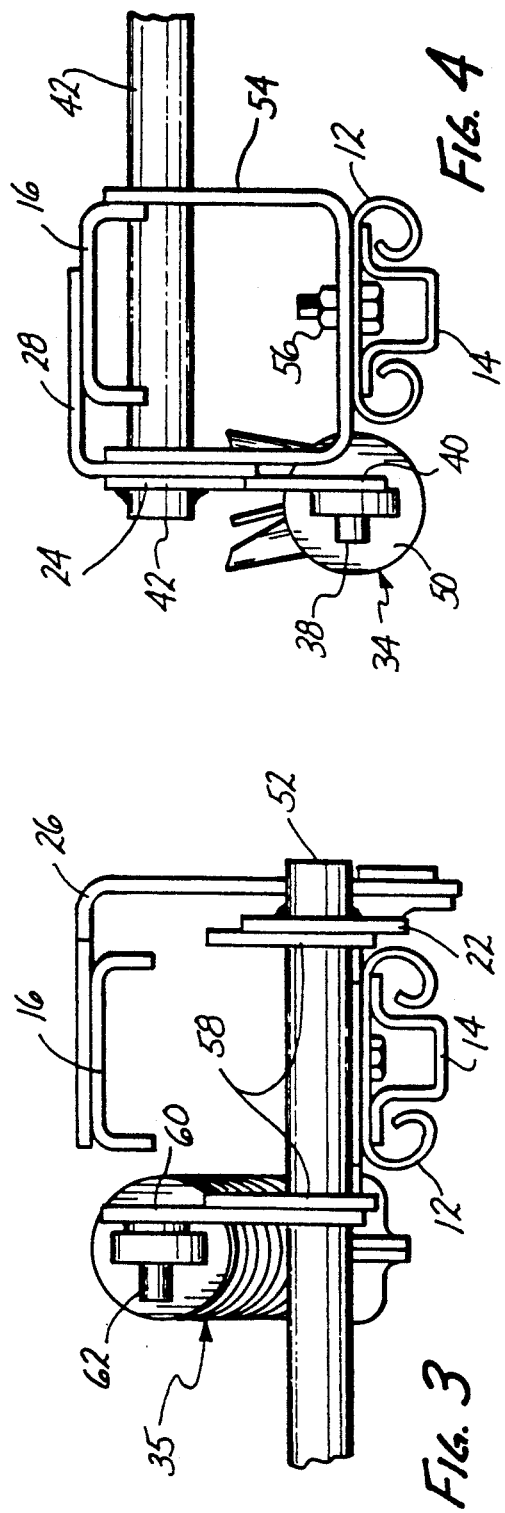

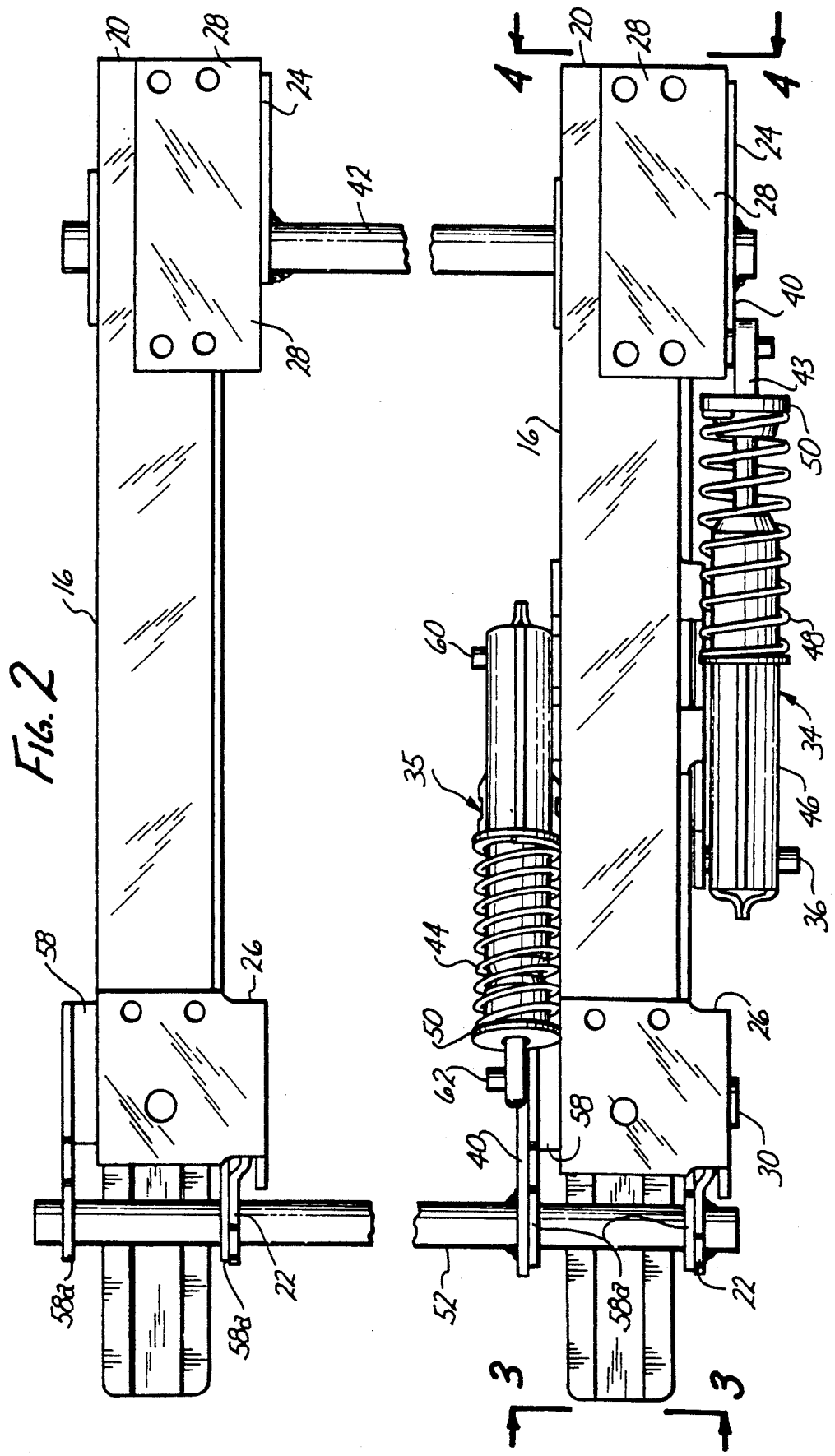

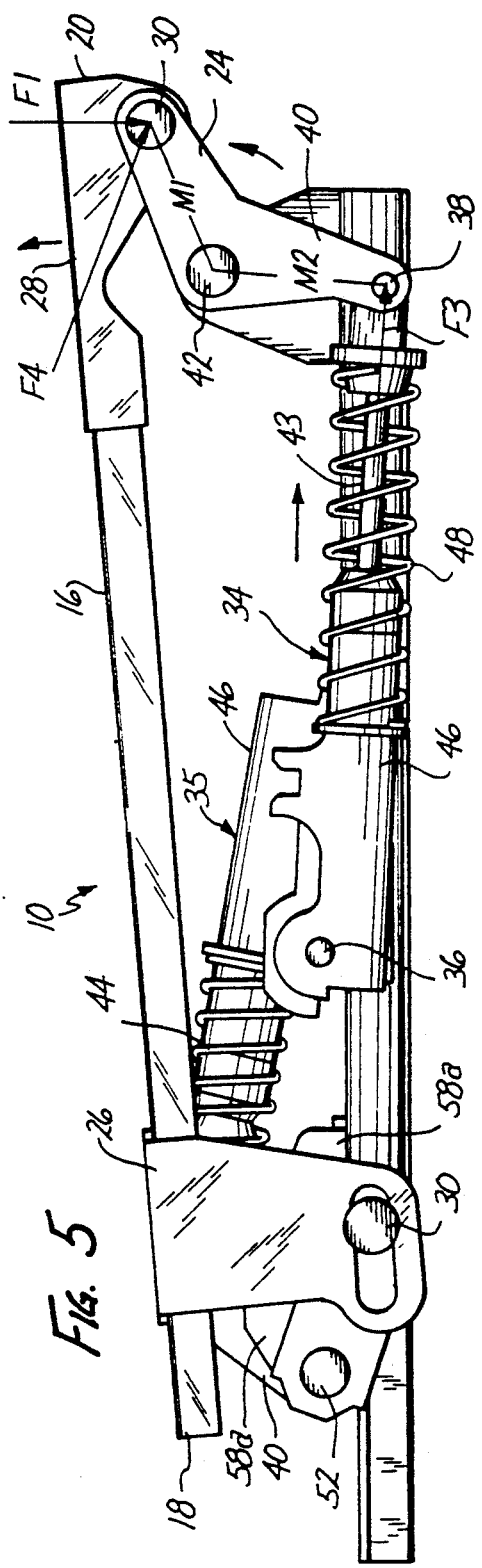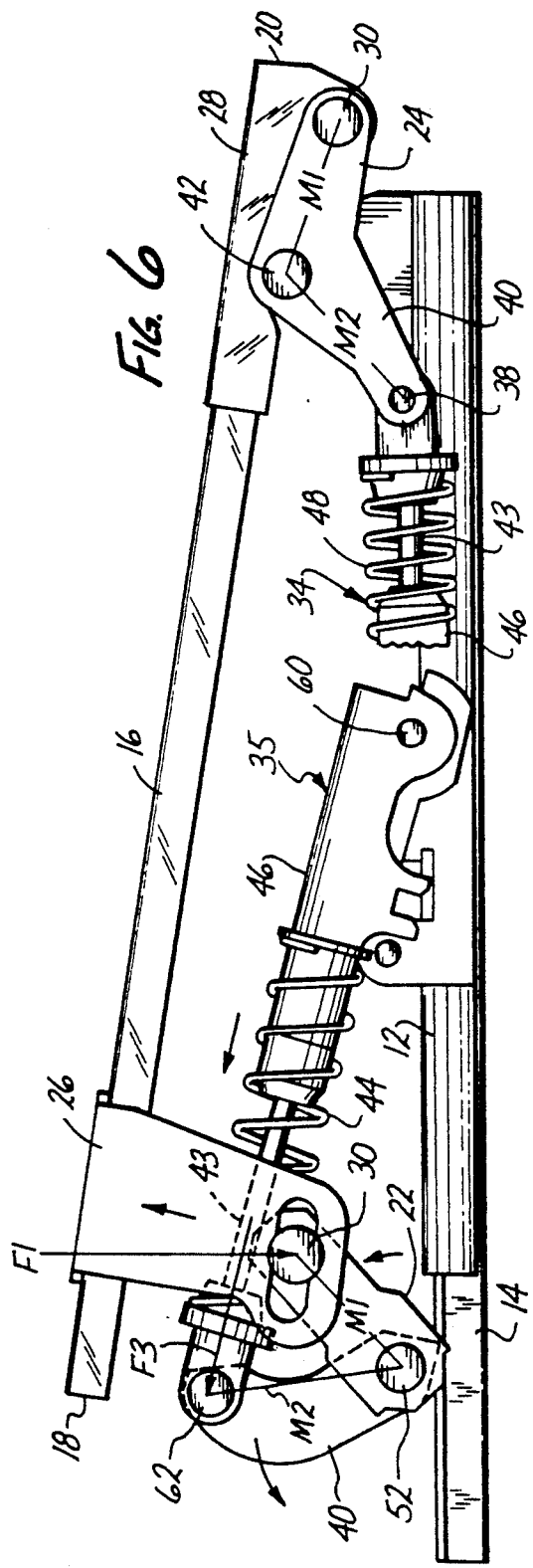

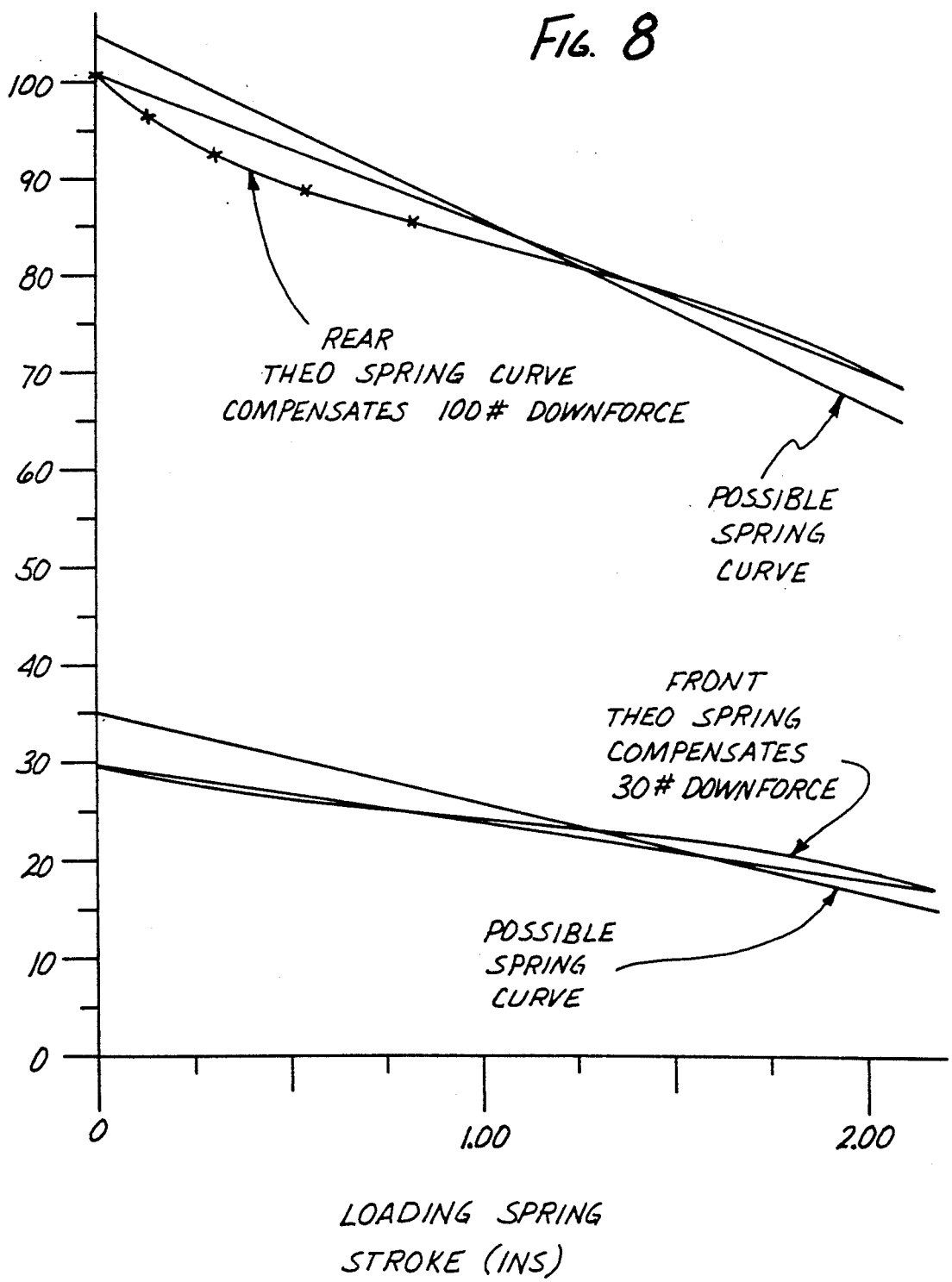

SEAT POSITION ADJUSTMENT MECHANISM

This is a file wrapper continuation of U.S. Ser. No. 07/132,873 filed Dec. 14, 1987, now abandoned.

BACKGROUND OF THE INVENTION

Field of the Invention

The present invention pertains generally to the field of position adjustable vehicular seats and more particularly is directed to a mechanical seat support and position adjustment unit particularly for use with automotive adjustable seats.

State of the Prior Art

A great deal of effort has been expended in the development of mechanisms and devices which permit the adjustment of automotive seats, particularly the driver's seat, for optimum convenience, comfort and safety. Existing adjustment mechanisms include purely mechanical systems where the adjustment is achieved by means of spring loaded levers and locks, electrically powered mechanisms where threaded elements are displaced along motor driven screws, or a combination of these two. The purely mechanical systems are favored particularly at the lower end of the economic scale because of their lower cost, ease of installation, and greater inherent reliability. Consequently, many mechanical seat adjustment units have been developed and are in use.

Purely mechanical seat adjustment units rely on the body weight of the seat occupant to overcome an upward spring bias and thus obtain a desired shift in seat position. Upon release of a lock an adjustment in seat position occurs under spring urging to the extent allowed by the occupant, who is able to control the degree and direction of adjustment by shifting his or her body weight in relation to the adjustment mechanism.

Existing mechanical seat adjustment units suffer from certain shortcomings. One source of difficulty in spring biased mechanisms resides in the variable loading force offered by the helical springs typically employed for this purpose. A constant rate spring as is well known requires increasingly greater compressive force as the spring is compressed. Thus, as the seat is depressed from a fully raised position, the occupant encounters increasing resistance and near the fully depressed position corresponding to near full spring compression, the body weight of a lightweight individual may be insufficient to further depress the seat because of the considerable spring force encountered. This difficulty is commonly overcome in many existing designs by providing an assist handle, i.e. a mechanical lever normally mounted on one side of the seat and operative for lowering the seat by adding leveraged manual force to the occupant's weight thereby to achieve full spring compression. However, as automobiles tend to become ever more compact, it becomes increasingly difficult and impractical to provide the space required for the assist lever. On the inboard side of the forward seats a center console is frequently provided, while on the outer side of the seats there is little room between the seat and the door panel as the automobiles shrink in size. The assist lever also adds visual clutter to the vehicle interior design and is undesirable for esthetic reasons as well.

For the foregoing reasons it has become desirable to provide a spring assisted seat position adjustment mechanism suitable for automotive use which is more responsive to adjustment by body weight and body movement alone without manual assist levers.

SUMMARY OF THE INVENTION

The present invention addresses the aforementioned needs by providing a seat adjustment mechanism having a base comprised of two parallel mounting rails for fastening to a seat mounting surface such as the floor board of an automotive passenger compartment, a pair of lower support beams longitudinally slidable along the mounting rails, and a pair of upper beams for supporting a seat fastened on the same. Two transverse, mutually parallel shafts are journaled to and interconnect the lower beams in fixed spaced parallel relationship. Each shaft carries a rocker arm and a pair of axially spaced apart lifter arms, which arms are fixed to and extend generally radially from the shafts. The upper beams have front ends pivotably connected on and supported between the radial outer ends of the two front shaft lifter arms, while the rear ends of the upper beams are similarly supported on the rear shaft lifter arms. Rotation of one shaft raises or lowers the corresponding end of both upper beams thereby tilting a seat supported thereon. A telescoping lock assembly is connected between the outer radial end of the rocker arm on each shaft and one of the lower beams. Each of the two lock elements is spring loaded by a constant rate spring towards a linearly extended condition so that expansion of the spring tends to rotate the shaft to which the particular rocker arm is connected, also rotating the lifter arms on the same shaft in a direction so as to elevate the ends of the upper beams supported on these lifter arms. The body weight of a seat occupant acts through the lifter arms and rocker arms to oppose the spring loading and telescopically compress the locks. Either the front or the rear ends of the seat supporting beams may be selectively raised by releasing the appropriate lock and shifting the occupant's weight away from that end to allow the spring to extend the lock thereby lifting the corresponding end of the upper beams and tilting the seat in the desired manner. Each lock is normally locked holding the two shafts against rotation to fix the seat in a particular position. Each lock is individually releasable through a cable release or the like and allows continuous independent adjustment of front and rear seat height within the design limits of the mechanism.

The mechanism of this invention improves over previous designs in that the geometry of the bell crank comprised of the lifter and rocker arms on each shaft is optimized in such a way that the mechanical advantage of the bell crank diminishes as the loading spring is compressed, i.e. as the loading spring force therefore increases. The net result is that the spring force actually transmitted through the rocker and lifter arms to the upper beams and ultimately upwardly to the seat remains approximately constant throughout the compression range of the spring.

In prior art designs it has been necessary to compromise in the choice of spring in order to allow a relatively lightweight occupant to fully depress the seat and overcome the force of the spring even near full compression. This solution has required the use of a relatively weak spring such that a person weighing e.g. one hundred pounds could fully depress the seat. This, on the other hand, creates a problem for heavier weight occupants; e.g. an individual weighing a hundred and eighty pounds would find inadequate spring resistance upon release of the lock from an elevated seat position and would find the seat quickly dropping towards maximum depression.

This problem is overcome in the present invention which maintains an approximately even spring force throughout the adjustment range of the seat and thus allows a better compromise to be made in terms of increased spring loading force to provide more adequate seat support for heavier individuals while remaining manageable by lighter weight persons.

Still further improvement in responsiveness is achieved by arranging the rear bell cranks such that backward force applied against the seat back rest produces a force component which is added to the downward body weight force vector and thus assists in depressing the rear end of the seat adjustment mechanism. Specifically, the rear lifter arms extend from the rear transverse shaft in a generally rearward and upward direction when in maximally elevated position. Backward force against the seat back rest operates to pivot downwardly the rear lifting arms, turning the rear shaft which turns the rocker arm in the direction necessary to compress the rear loading spring and depress the rear end. A lightweight seat occupant may assist in lowering the rear of the seat by pushing back against the seat back rest. The trend towards more compact and low slung automobiles forces the driver and front passenger into an increasingly reclining position on the seats, with legs extended forward so that it becomes easier to push back against the seat back rest than to shift one's body weight in order to apply a vertically downward force to depress the mechanism.

These and other features and advantages of this invention will be better understood from the detailed description of the preferred embodiment below considered with reference to the attached drawings.

BRIEF DESCRIPTION OF THE DRAWINGS

FIG. 1 is a side elevational view of the seat adjustment mechanism according to this invention;

FIG. 2 is a top plan view of the mechanism of FIG. 1 with middle portions of the transverse shafts broken away and omitted;

FIG. 3 is a front end view of one side of the mechanism taken along line 3—3 in FIG. 2;

FIG. 4 is a rear end view of one side of the mechanism taken along line 4—4 in FIG. 2;

FIG. 5 is a side view as in FIG. 1 with the rear end of the mechanism in an elevated condition;

FIG. 6 is a side view as in FIG. 1 with the front end of the mechanism in an elevated condition;

FIG. 8 shows loading spring curves for a practical example of this invention.

DETAILED DESCRIPTION OF THE PREFERRED EMBODIMENT

Figure 7A:
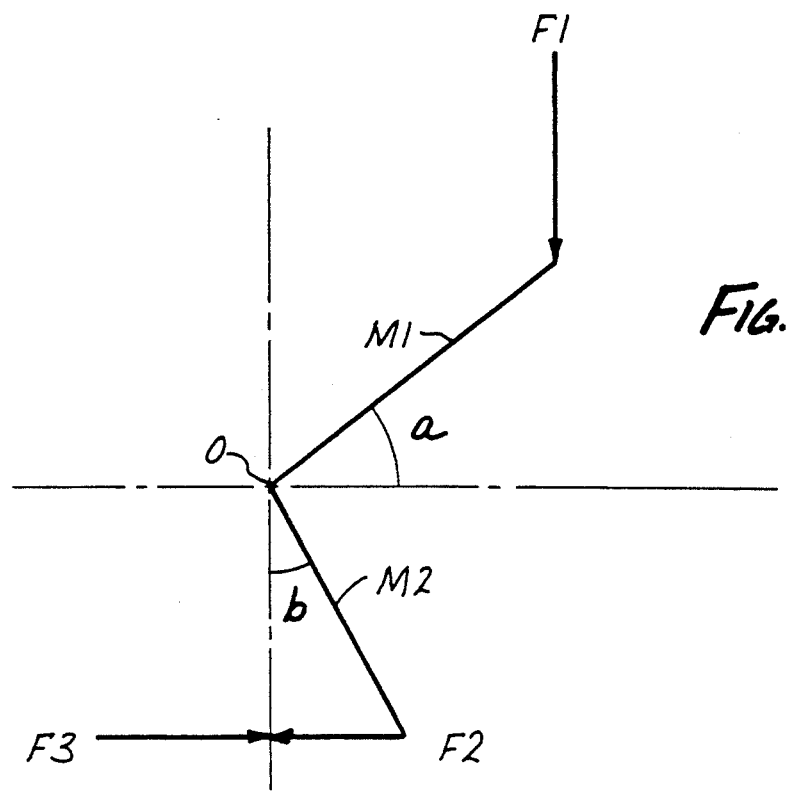
FIG. 7a is a vector diagram illustrating the forces acting on the rear end of the seat adjustment mechanism.

With reference to the drawings, FIGS. 1 and 2 show the seat position adjustment mechanism 10 as having a pair of lower beams 12 slideable along mounting rails 14, and a pair of parallel upper seat supporting beams 16. The lower beams 12 are interconnected in fixed spaced mutually parallel relationship by two transverse connecting shafts including rear shaft 42 and front shaft 52. The rear shaft 42 is rotatably supported by the upright legs of two rear U-brackets 54, the bases of which are bolted to lower rails 12 by fasteners 56, or may in the alternative be welded or riveted to the same. The front transverse shaft 52 is pivoted to the upright legs 58a of front U-brackets 58, the bottoms of which are fastened to the corresponding lower beams 12. A pair of lifter arms is radially fixed to and rotatable with each of the shafts 52, 42.

A front bracket 26 and a rear bracket 28 are fixed to each upper beam 16. Each bracket is an inverted L with a horizontal leg fastened to the top surface of the upper beam 16 and a dependent vertical leg pivotably connected at pivot points 30 to the radial outer end of a corresponding lifter arm 22, 24. The front brackets 26 are supported on front lifter arms 22 while the rear brackets 28 are supported on rear lifter arms 24. The rear pivot points 30 are fixed on the bracket 28 while the forward pivot points 30 are linearly displaceable within a slot 32 in each bracket 26 in order to accommodate a linear displacement component of the upper beams upon rotation of the lifter arms. Alternatively, the slot may provided at the rear pivot points for the same effect. Each shaft 42, 52 also carries a fixed radial rocker arm 40. A linear rear lock 34 is anchored at its housing end to the lower beam 12 at pivot 36 and is pivotably connected at at its opposite rod end 38 to the radially outer end of a rear rocker lever 40, the inner end of which is fixed to the rear transverse shaft 42. In the drawing, the rocker lever 40 and lifter lever 24 are shown as a unitary bell crank element but may instead be separate lever elements axially spaced along shaft 42. The linear lock element 34 includes a rod 44 axially slidable through a tubular lock housing 46, and a rear loading coil spring 48 is axially compressed between the lock housing 46 and retainer disk 50 fixed near the end of the rod 43, normally loading the lock 34 towards a telescopically extended position wherein the rod 43 is axially withdrawn from the housing 46. The lock 34 includes a mechanism internal to the lock housing 46 by which the rod 43 is normally locked to the housing 46 against axial translation relative thereto. The lock mechanism is remotely releasable through a flexible release cable (not shown) connected at its distal end to a remote release button or other actuator mounted to one side of the seat for convenient access by the seat occupant. A complete description of the construction and operation of the preferred linear lock mechanism 34 is found in commonly owned U.S Pat. No. 4,577,730 issued Mar. 25, 1986, and the lock is available from the common assignee as product number MM65 LOXX.

FIG. 1 shows the rear end 20 of the mechanism 10 in fully depressed condition, the rear lock 34 in a telescopically contracted state, and rear loading spring 48 at maximum compression. When the rear lock 34 is remotely released from its normal locked condition, the rod 43 is urged towards a telescopically extended condition by helical coil spring 48, turning the rocker arm 40 and rotating rear shaft 42, thereby also turning the rear lifter arms 24 in a counter-clockwise direction to lift the rear ends 28 of the upper beams 16 to the elevated position shown in FIG. 5. The rear of the seat adjustment mechanism 10 may be returned to the depressed condition of FIG. 1 by again releasing the rear lock 34, applying sufficient downward force to the rear end 20 to compress and overcome the loading of rear spring 48 and thus linearly shorten the lock 34, and then locking the device 34 in the contracted state to hold the mechanism 10 in the depressed state.

The front end of the seat adjustment device operates in a similar manner and includes a front lock 35 similar to the rear lock 34 with a lock housing 46 pivotably anchored to the same lower beam 12 at pivot point 60, as best understood by reference to FIGS. 2 and 3, and a lock rod 43 pivotably connected at 62 to the radially outer end of front rocker arm 40 which is radially affixed to the front transverse shaft 52. Telescopic extension of the front lock 35 under the urging of front loading spring 44 causes counter-clockwise rotation of the transverse shaft 52 in FIG. 1, turning the front lifter arms 22. Counter-clockwise rotation of the lifter arms 22 raises the front ends 18 of the upper beams 16 towards an elevated position shown in FIG. 6. The front ends 18 can be returned to the depressed position of FIG. 1 by releasing the front lock 35, applying sufficient downward force to overcome and compress front loading spring 44 and turn front shaft 43 and front lifter arms 22 clockwise, thereby telescopically shortening the front lock 35, and finally reengaging the front lock 35 to secure the mechanism in the new position.

It will be appreciated that the height adjustment of the front ends 18 and rear ends 20 of the upper beams 16 is independent of each other and is achieved by selectively releasing the corresponding locks 34, 35 by individually actuatable remote releases. As a result of these independent height adjustments, a seat bolted to the upper beams 16 can be tilted up and down in the front and rear, and by combining the front and rear adjustments in a rocking motion the seat can also be raised or lowered without significantly affecting its tilt.

The loading springs 44, 48 are helical coil springs having a constant spring rate, and therefore offer linearly increasing resistance as each is compressed during depression of the corresponding end of the seat support mechanism 10. The front and rear lifter arms in the fully elevated position extend upwardly and rearwardly of the corresponding transverse shaft 52, 42. The body weight of the seat occupant applies a downward force to the ends of the lifter arms at pivot points 30 tending to rotate the shafts clockwise together with the corresponding rocker arms 40. This tendency is normally resisted by the locked condition of the front and rear locks 35, 34 which hold the mechanism 10 and the seat supported thereon in a selected position.

The downward body weight force vector F1 acts through a first arm M1 presented by the lifter arms 22, 24, and is transmitted to the linear lock/spring assembly through a second arm M2 presented by the rocker arm 40 as indicated in FIGS. 5 and 6. FIG. 7a graphically shows the force vector diagram, from which it can be seen that the net force F2 transmitted by the ratio of arms M1/M2 to the lock rods against spring loading force F3 is a function of the instantaneous angles a between arm M1 and a line parallel to the lock rod, and b between arm M2 a line perpendicular to and the lock rod (which is also substantially the axis of the loading spring).

The net axially compressive force F2 applied to the loading spring and opposing the spring loading force F3 is $$F2 = F1 \frac{M1\cos a}{M2\cos b}$$

The spring loading force F3 is

F3=dL R where dL is the stroke length of the loading spring being compressed and R is the spring rate characteristic of the loading spring.

The minimum force F1 required to compress the loading spring and thus depress the rear end of the seat adjustment mechanism 10 is given by $$F1(min) = dLR \frac{M2\cos b}{M1\cos a}$$

The quotient in the above expression increases in nearly linear fashion within certain ranges of angles a and b, for example, where a is between 45 and 0 degrees and b=90+/−45 degrees.

The front and rear loading coils 44, 48 are wound to have a constant spring rate which approximates the negative of the "average" slope of the F2 function within the given range, and a spring force in the extended state equal to the downward force which it is to oppose. The increasing spring force F3 as the loading spring is compressed during depression of the mechanism 10 is thus approximately offset by the increasing mechanical advantage of the M1/M2 bell crank arrangement, such that an approximately constant downward force of magnitude greater than W (min) will fully depress the mechanism. Viewed from the spring end, the bell crank net leverage diminishes as the shaft rotates towards the depressed condition, reducing the spring loading force transmitted to the seat by the lifter arms as the actual force exerted by the spring on the rocker arm increases, the two trends approximately offsetting each other to maintain a roughly constant upward force on the seat ends at all positions of the mechanism 10. Typically, the rear end of the seat requires greater spring loading as it supports the greater portion of the occupant's body weight. FIG. 8 illustrates theoretical spring curves calculated for the seat adjustment mechanism 10 for both the front and rear ends of the seat adjustment mechanism, and where the rear loading spring 48 is selected to oppose a weight of 100 pounds and the front loading spring 44 a downward weight of 30 pounds. To these theoretical curves are fitted possible i.e. practically realizable spring curves, and the loading springs 48, 44 are wound to match these possible spring curves.

In previously known mechanisms the increase in spring force during compression resulted in a compromise in the selection of the loading spring: if a lighter weight individual was to overcome the maximum spring force necessary to fully depress the seat, the spring force at maximum seat elevation had to be reduced resulting in inadequate support for heavier individuals who tended to drop with the seat upon release of the rear lock 34. By optimizing the geometry of the rocker angles C & D and lifter arms as here described it therefore becomes possible to use a heavier loading spring 48 than was previously practical, and thus provide better support for heavier individuals when the rear lock 34 is released, without thereby making it impossible for lighter weight persons to depress the seat adjustment mechanism 10. The same optimized geometry can be implemented with similarly improved results at the front end of the mechanism 10 to obtain substantially even spring force opposing the occupant's weight throughout the front adjustment range of the mechanism.

Figure 7B:
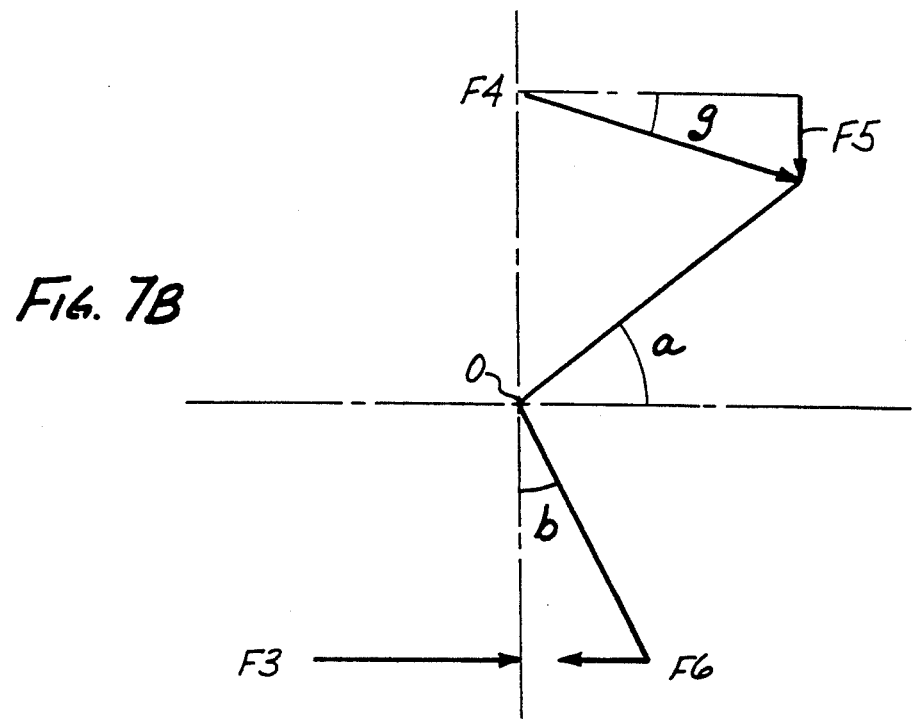
FIG. 7b is a vector diagram illustrating the effect of force applied against the seat back rest to assist in overcoming the rear spring loading.

An additional novel feature of the improved seat adjustment mechanism 10 lies in the arrangement of the rear lifter arms such that the seat occupant can assist in depressing the rear end 20 by pushing backwards against the seat back rest which is easily achieved in a vehicle by leaning back in the seat and pushing with the feet against the floorboard or firewall of the passenger compartment. Considerable backward force can be be applied in this manner by even a lightweight person, the effect of which is a tendency to pivot the seat about the front pivot points 30 and to depress the rear end 20 of the mechanism 10. FIG. 7b shows a force vector diagram illustrating a vector F4 applied to the seat back rest which in automobiles is typically at a 25 degree angle g (gamma) to the vertical resulting in a downward force component F5 acting on the end of the rear lifter arms 24 represented as arm M1 in FIG. 7b. Vector F5 is added to force vector F1 in FIG. 7a, i.e., the weight of the seat occupant to thus increase the force F2 opposing the spring loading F3 and facilitate compression of the rear spring 48. The possibility of providing such an assist is made possible by orienting the rear lifter arms upwardly and rearwardly from the rear shaft 42 so that the assist force is added to the weight vector and both vectors cooperate in turning the rear rocker arm 40 against the spring loading. Such additive effect is not possible if, for example, the rear bell crank is reversed so that the lifter arms extend upwardly and forwardly from the rear shafts 42 and the bell crank turns counterclockwise from elevated to depressed position in the views of FIGS. 5 and 6. It must be appreciated that this latter arrangement would be fully operative for depressing the rear end 20 in response to occupant weight, but would not respond to the aforedescribed assist force applied against the back rest. Nevertheless, such a reversed rear bell crank arrangement will benefit from the optimized geometry described in connection with FIG. 7a so as to obtain a nearly constant effective spring force transmitted to the rear end 20, and this optimization of the arm geometry is an improvement independent of the rearward orientation of the rear lifter arm and clockwise rotation of the rear rocker 40 during seat depression so as to add an active boost or assist force provided by the seat occupant to the occupant's weight. The useful application of the occupant provided assist further enhances the ability of a lightweight individual to overcome the loading of the rear spring 48 and therefore permits the use of still heavier loading springs which better compensate the weight of heavier persons without significant inconvenience to the lighter individuals.

The mechanism 10 will normally be provided with a suitable detent or lock for adjustably locking the lower beams 12 to the mounting rails 14, so as to permit adjustment of the seat position forward or backward along the mounting rails, for adjusting for example the spacing between a vehicle seat and the steering wheel. A variety of detent mechanisms suitable for this purpose are known and need not be described here.

The preferred embodiment is described by way of example only for purposes of clarity, and many changes, substitutions and modifications to the described embodiment will occur to those possessed of ordinary skill in the art without thereby departing from the spirit and scope of the invention, which is limited only by the following claims.

What is claimed is:

1. In an adjustable seat support mechanism of the type having a stationary base, upper support means having a front end and a rear end, and telescopable lock means interconnecting said front and rear ends and said base such that said ends are independently positionable relative to said base within an adjustment range for adjusting the height and tilt of a seat supported on said upper support means, the improvement comprising:

upward biasing means connected between said rear end and said base operative for elevating said rear end upon release of said lock means, characterized in that the upward bias acting on said rear end is an approximately constant force throughout said adjustment range.

2. The improvement of claim 1 wherein said biasing means comprises spring means for extending said lock means and lever means interposed between said lock means and said rear end, said lever means configured and dimensioned to compensate for variable force of said spring means on said lock means throughout said adjustment range thereby to maintain approximately constant said upward bias on said rear end.

3. The improvement of claim 2 wherein said lock means are telescopically extendable between two opposite ends, one end being pivotably affixed to said base, lever means include first and second arms radially fixed to a common rotary shaft journaled to said base, one said arm pivotally connected to the opposite end of said lock means and defining an angle b with a line perpendicular to said lock means, the other arm pivotally connected to said rear end and defining with said lock means an angle a with a line parallel to said lock means, characterized in that the effective length of said arms and said angles a and b are selected such that the combined mechanical advantage of said lever means approximately offsets the increasing force required to incrementally compress said spring means as said rear end is depressed, whereby said upward bias remains approximately constant.

4. The improvement of claim 3 wherein the bias force applied to the rear end by said spring means is given by the function $$F1 = dLR \frac{M2\cos b}{M1\cos a}$$

where F1 is the effective bias force on said rear end; dL is the stroke length of said spring means; R is the spring rate characteristic of said spring means M1 and M2 are the effective radial lengths of said first and second lever arms respectively, characterized in that the ranges of angles a and b between a depressed and an elevated condition of said rear end are selected such that the value of F varies in approximately linear fashion throughout said ranges; and said spring means is a constant rate spring selected such that the effective force exerted by said spring means and given by the expression F3=dL R varies linearly as said spring means is compressed; and the spring rate of said spring means is selected to approximate the negative of the approximately linear slope of the quotient in said F1 function, whereby incremental changes in the product dL R are approximately offset by corresponding changes in said quotient and the magnitude of said bias force F1 remains approximately constant for said selected range of said angles a and b.

5. The improvement of any of claims 1 through 4 wherein said upward biasing means is arranged and configured such that a rearward force on the backrest of a seat supported on said upper support means with the backrest oriented towards said rear generates a force component which is added to the force component generated by the weight of an occupant of the seat for opposing said upward bias thereby to depress said rear end.

* * * * *